United States Patent [19]

Landoll

[11] 4,231,710
[45] Nov. 4, 1980

[54] TILTABLE TRAILER HAVING MOVABLE UNDERCARRIAGE

[75] Inventor: Donald R. Landoll, Marysville, Kans.
[73] Assignee: Landoll Corporation, Marysville, Kans.
[21] Appl. No.: 22,922
[22] Filed: Mar. 22, 1979
[51] Int. Cl.³ .............................................. B60P 1/04
[52] U.S. Cl. ................................ 414/475; 280/80 B; 280/43.23
[58] Field of Search .............. 414/475, 484; 280/80 B, 280/81 R, 405 A, 43.23, 43

[56] References Cited
U.S. PATENT DOCUMENTS

| 3,087,741 | 4/1963 | De Lay | 280/81 R |
| 4,125,198 | 11/1978 | Landoll | 414/484 |

*Primary Examiner*—Stephen G. Kunin
*Assistant Examiner*—Lawrence E. Williams
*Attorney, Agent, or Firm*—Schmidt, Johnson, Hovey & Williams

[57] ABSTRACT

A tiltable trailer is provided with longitudinal beams spaced such as to be located directly beneath the wheels of equipment to be hauled thereby, eliminating the need for heavy cross pieces beneath the deck for the supporting wide loads, thereby contributing toward decreased trailer weight. A lower deck height is accomplished by having the tracks for the rollers of the reciprocable undercarriage and the ramps of such tracks located within the beams, by positioning the undercarriage between the beams and by providing the undercarriage with a low-profile beam support which, in turn, has roller-mounting cross members immediately ahead of and immediately behind the wheel and axle assemblies.

4 Claims, 9 Drawing Figures

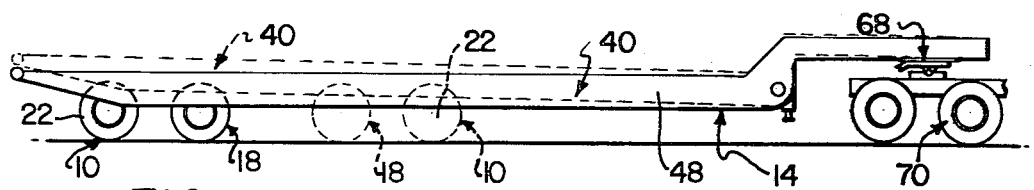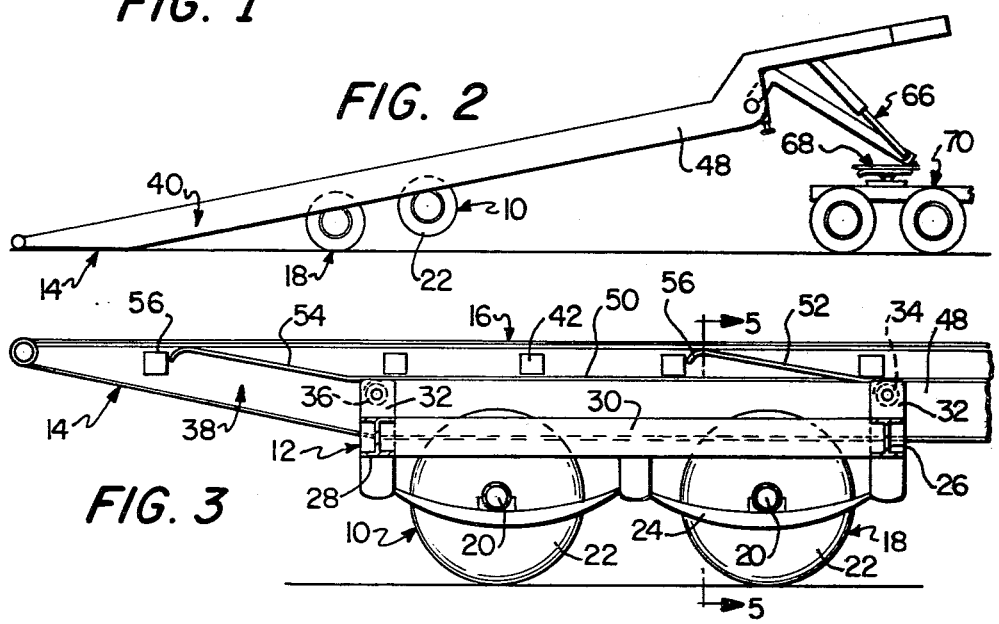

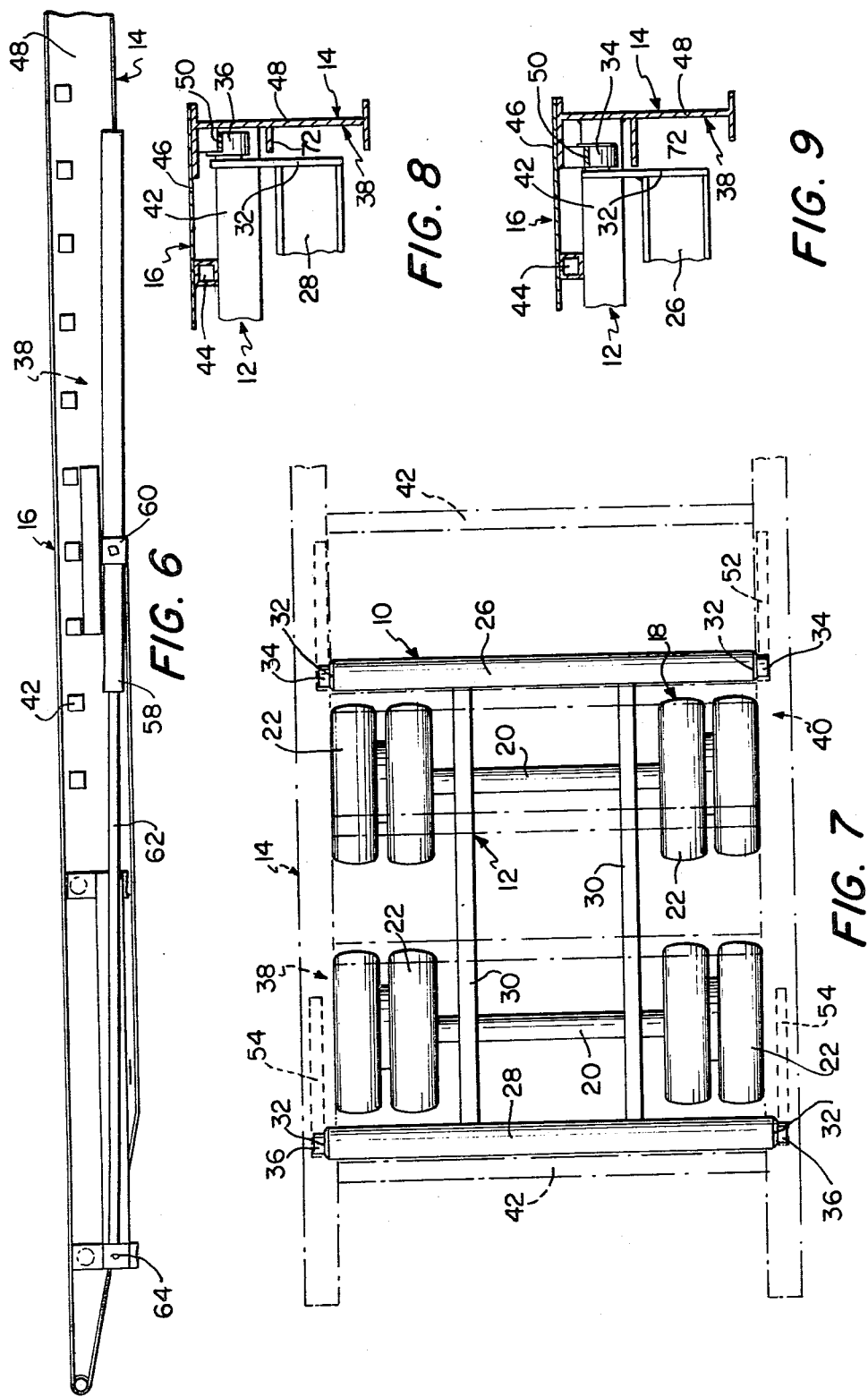

TILTABLE TRAILER HAVING MOVABLE UNDERCARRIAGE

The present invention relates to my U.S. Letters Pat. No. 4,125,198 issued Nov. 14, 1978 and incorporates certain additional features for carrying out the concept therein disclosed such as to expand their uses and provide supplemental advantages. In that regard, I have been able to lower the over-the-road height of the trailer, ease the loading and unloading tasks still further, reduce the overall weight of the trailer, and provide a direct underlying support for the wheels of the cargo to be hauled by the trailer.

As distinguished from the trailer of my patent, the trailer of the instant invention uses side beams between which the undercarriage is located, with the tracks and the ramps inside the beams. The rollers which underlie the tracks are uniquely mounted on two cross members of a low-profile support on the undercarriage, the wheel and axle assemblies of the undercarriage being also disposed between the front and rear cross members.

In the drawings:

FIG. 1 is a side-elevational view of a tiltable trailer having a movable undercarriage made in accordance with my present invention;

FIG. 2 is a side-elevational view of the trailer in its tilted condition;

FIG. 3 is an enlarged fragmentary vertical cross-sectional view;

FIG. 4 is a view similar to FIG. 3 but showing the undercarriage at the rearmost end of its path of travel;

FIG. 5 is a cross-sectional view taken on line 5—5 of FIG. 3;

FIG. 6 is a fragmentary view for the purpose of illustrating the power means for shifting the undercarriage;

FIG. 7 is a somewhat schematic plan view of the undercarriage;

FIG. 8 is a fragmentary detailed cross-sectional view taken on line 8—8 of FIG. 4; and FIG. 9 is a fragmentary detailed cross-sectional view taken on line 9—9 of FIG. 4.

An undercarriage 10 has a support 12 for a frame 14 that, in turn, receives an overlying deck 16. The support 12 is carried by two wheel and axle assemblies 18 below the tops of the latter. The axles 20 for the wheels 22 have springs 24 connected to a pair of elongated cross members 26 and 28 forming a part of the support 12. The parallel members 26 and 28 are spaced apart fore and aft of the undercarriage 10 and are joined by a pair of front-to-back, horizontally spaced elements 30 between the assemblies 18 directly overlying the springs 24 such that the latter are attached to both the members 26 and 28 and to the elements 30.

The front member 26 is shorter than the rear member 28 and they are both provided with an upstanding roller mount 32 secured to each outer end thereof. Front rollers 34 are carried at the upper and outer ends of the mounts 32 of the member 26 and rear rollers 36 are carried in the same manner by the mounts 32 of the member 28 such that all four rollers 34 and 36 rotate within a common, normally horizontal plane about horizontal axes that traverse the path of travel of the undercarriage 10. The entire support 12, except only for the upper ends of the mounts 32 and their rollers 34 and 36, is below the tops of the wheels 22 even when the deck 16 is unloaded. The front member 26 is approximately as long as the width of the assemblies 18 and the member 28 is only slightly longer. Both members 26 and 28 are closely adjacent the assemblies 18.

The frame 14 has a pair of elongated, parallel beams 38 and 40 that are horizontally spaced and extend fore and aft of the undercarriage 10, the distance therebetween being greater than the length of the member 28, and therefore, slightly greater than the width of the assemblies 18 therebetween, such width being no greater than the distance between the rollers 34.

The beams 38 and 40 are connected by a series of spaced, transverse cross pieces 42 which, in turn, have spaced front-to-rear overlying joists 44 of the deck 16 connected thereto, the network of cross and longitudinal joists 44 and the beams 38 and 40 serving as the support for a floor 46 for the deck 16.

Each beam 38 and 40 has an upstanding web 48 coextensive in length therewith, and each web 48 has an inwardly extending track 50 common to the corresponding rollers 34 and 36 therebeneath. Each track 50 has a front ramp 52 for the roller 34 therebelow and a rear ramp 54 for the roller 36 therebelow spaced from the ramp 52, with all of the ramps 52 and 54 inclined upwardly and rearwardly and with each ramp 52 and 54 provided with a downwardly curled roller stop 56 at its uppermost and rearmost end. The cross pieces 42 are just above the tracks 50, but below the tops of the stops 56.

A hydraulic cylinder 58 is pivotally connected to the support 12 by a universal joint 60 and has its piston rod 62 pivotally connected at 64 to the frame 14. A tilting unit 66 interconnects the frame 14 and fifth wheel 68 of a towing tractor 70. Inturned flanges 72 on the webs 48 limit the extent of movement of the rollers 34 away from tracks 50 when the undercarriage is shifted forwardly by the cylinder 58, and the frame 14 is then tilted by the unit 66.

From the foregoing, it can be appreciated that there is a distinct advantage to the provision of the two longitudinally extending side beams 38 and 40 directly below the wheels of heavy machinery, implements and the like to be loaded onto the trailer, hauled thereby and unloaded therefrom. The number, size and strength of the cross pieces 42 can therefore be reduced, decreasing the overall weight of the trailer. Moreover, the floor 44 of the deck 16 becomes adequately supported by the joists 44, by the beams 38 and 40 and by the underlying cross pieces 42 which span the distance between the beams 38 and 40.

The low profile of the supports 12 of the undercarriage 10, below the upper extremities of the wheels 20, permitted in part by the use of the two cross members 26 and 28, not only provides a suitable loading and unloading angle as shown in FIG. 2 but also permits an approximate 36" height for the deck 16 as shown by full lines in FIG. 1. These and other advantages are accomplished by virtue of the location of the rollers 34 and 36 at the outer ends of the novel cross members 26 and 28 closely adjacent the wheels 22. This makes possible the incorporation of the tracks 50 and their ramps 52 and 54 within the beams 38 and 40, inside the webs 48 of the beams 38 and 40 immediately above the rollers 34 and 36.

The operation is essentially the same as that disclosed in my patent, that is to say, during over-the-road travel, the rollers 34 and 36 are located beneath the ramps 52 and 54 against the stops 56 with the deck 16 essentially horizontal as shown by full lines in FIG. 1.

Prior to loading or unloading, the cylinder 58 is actuated to pull the undercarriage 10 forwardly as shown in FIG. 3 to the position illustrated in FIG. 1, thereby raising the rear end of the deck 16 upwardly as seen by dotted lines in FIG. 1. The tilt unit 66 is thereupon actuated, placing the rear end of the beams 38 and 40 onto the ground, causing the front wheels 22 of the undercarriage 10 to rise slightly, limited by the flanges 72. It is to be pointed out, that while the deck 16 chosen for illustration is flat throughout, the principles of my present invention are especially advantageous for use in those types of trailers having an intermediate "well" for receiving the cargo to lower the overall height of the cargo still further during transit. In those types of trailers, the equipment to be hauled can be easily driven onto and off the trailer without need for auxiliary towing procedures or derricks and other lifting devices.

I claim:

1. In a trailer,
 an undercarriage provided with wheel axle assemblies and with a support below the tops of the assemblies,
 said support including an elongated front cross member carried by the assemblies thereahead and an elongated rear cross member carried by the assemblies therebehind,
 said front member being connected with and shorter than the rear member and being of substantially the same length as the width of said assemblies,
 each member having a roller at each outer end thereof, presenting a first set of front and rear rollers, and a second set of front and rear rollers horizontally spaced from the first set.
 the rollers being in a common, normally horizontal plane and being rotatable about axes above said tops of the assemblies with said axes traversing the path of travel of the undercarriage; and
 a frame provided with a pair of elongated, parallel, interconnected, horizontally spaced beams extending fore and aft of the undercarriage,
 the distance between the beams being greater than the length of said rear member,
 one beam having an inwardly and longitudinally extending track resting on said first set of rollers,
 the other beam having an inwardly and longitudinally extending tract resting on said second set of rollers,
 each track having a pair of longitudinally spaced upwardly and rearwardly inclined ramps, one for the corresponding front roller and one for the corresponding rear roller whereby the height of the frame is lowered to an essentially horizontal position when the undercarriage is shifted rearwardly relative to the beams.

2. The trailer of claim 1, there being an upstanding roller mount secured to each of said outer ends of each member respectively, the rollers being rotatably carried by the mounts above the members.

3. The trailer of claim 1, said frame having a plurality of elongated cross pieces spaced apart longitudinally of the beams and interconnecting the same at a level above the tracks and below the upper, rear ends of the ramps.

4. The trailer of claim 3; and a deck having a network of longitudinal and cross joists between the beams, and a floor resting on the joists and the beams and attached thereto.

* * * * *